United States Patent
Schaffer et al.

(10) Patent No.: US 7,296,482 B2
(45) Date of Patent: Nov. 20, 2007

(54) FLOWMETER

(75) Inventors: Joseph W. Schaffer, Greenwood, IN (US); Dean Sylvia, The Woodlands, TX (US)

(73) Assignee: Endress + Hauser Flowtec AG, Reinach (CH)

( * ) Notice: Subject to any disclaimer, the term of this patent is extended or adjusted under 35 U.S.C. 154(b) by 437 days.

(21) Appl. No.: 10/614,759

(22) Filed: Jul. 8, 2003

(65) Prior Publication Data
US 2005/0005709 A1    Jan. 13, 2005

(51) Int. Cl.
*G01F 1/00*    (2006.01)
(52) U.S. Cl. .................................................... 73/861
(58) Field of Classification Search ............ 73/861.28, 73/861.27, 861.08, 861
See application file for complete search history.

(56) References Cited

U.S. PATENT DOCUMENTS

| 4,663,977 A | * | 5/1987 | Vander Heyden | ........ 73/861.27 |
| 5,578,763 A | * | 11/1996 | Spencer et al. | .......... 73/861.08 |
| 5,831,175 A | * | 11/1998 | Fletcher-Haynes | ....... 73/861.28 |

* cited by examiner

*Primary Examiner*—Jewel Thompson
(74) *Attorney, Agent, or Firm*—Bacon & Thomas, PLLC

(57) ABSTRACT

A flowmeter suitable for replacement of differential pressure flowmeters comprising: a primary flow sensor, sensor electronics for proving a measurement signal; a signal processing unit for determining the flow, which can be set to produce a signal proportional to the flowrate or the square of the flowrate; and an output signal generator for generating an output signal proportional to the signal of the signal processing unit.

2 Claims, 1 Drawing Sheet

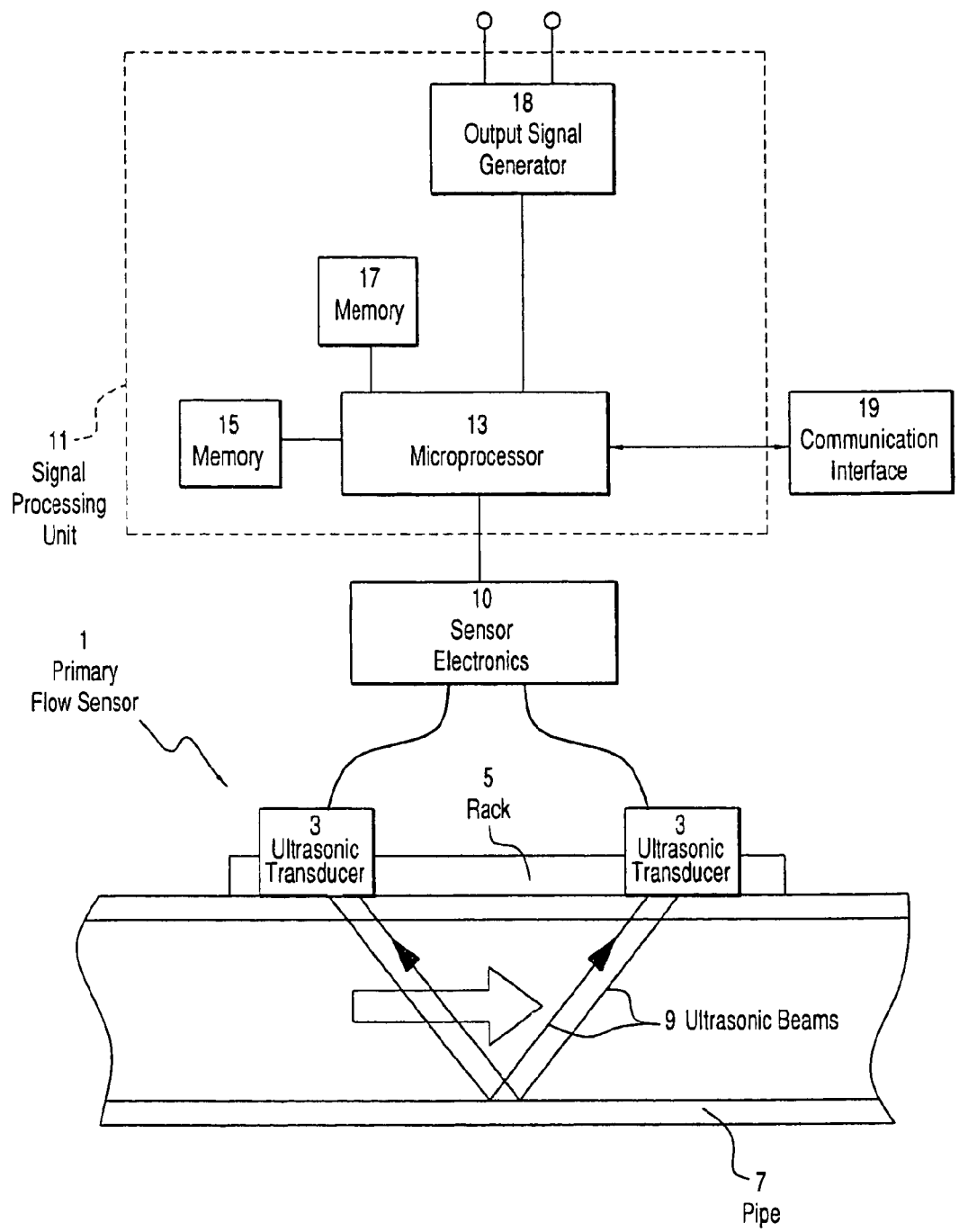

FLOWMETER

FIELD OF THE INVENTION

The present invention relates to flowmeters

BACKGROUND OF THE INVENTION

Flowmeters are commonly used devices for measuring a flow of a liquid through a pipe. In various branches of industry, for example in the chemical industry or in the pharmaceutical industry, the measurement data obtained by flowmeters is used to control complex industrial processes.

There is a wide range of flowmeters using different measurement principles on the market, for example, electromagnetic flowmeters; differential pressure flowmeters; magnetic inductive flowmeters; ultrasonic flowmeters; and coriolis or vortex flowmeters.

Electromagnetic flowmeters make use of Faraday's law of induction which states that a voltage is induced in a conductor moving in a magnetic field. In electromagnetic flowmeters the flowing medium corresponds to the moving conductor. The induced voltage is proportional to the flow velocity and is detected by two measuring electrodes and transmitted to the amplifier. Flow volume is computed on the basis of the pipe's diameter. The constant magnetic field is generated by a switched direct current of alternating polarity.

Ultrasonic flowmeters use acoustic waves or vibrations of a frequency of more than 20 kHz. Depending on the design, they use either wetted or non-wetted transducers on the pipe perimeter to couple ultrasonic energy with the fluid in the pipe.

Some ultrasonic flowmeters operate on the Doppler effect, whereby the transmitted frequency is altered linearly by being reflected from particles and bubbles in the fluid. The frequency shift is linearly proportional to the rate of flow of materials in the pipe and is used to develop a signal proportional to the flow rate.

In addition there are flowmeters on the market, that measure the difference in transit time between pulses transmitted in a single path along and against the flow. Two transducers are used, one upstream of the other. Both act as transmitters and receivers for the ultrasonic beam. The flow velocity is directly proportional to the difference of the upstream and downstream transit times. A product of a cross-sectional area of the pipe and the flow velocity provides a measure of the volumetric flow.

Coriolis flowmeters operate on the coriolis effect. A mass flow dependent Coriolis force occurs when a moving mass is subjected to an oscillation perpendicular to the flow direction. The measuring system accurately determines and evaluates the resulting effects on the measuring tubes.

Vortex flowmeters operate according to Karman's vortex principle. Vortices are created and alternate behind a bluff body. The number of vortices shed per time unit, the vortex frequency, is directly proportional to the flow rate.

Differential pressure flowmeters comprise a differential pressure sensor and a flow restricting element inserted in the flow channel, for example an orifice or a nozzle. According to Bernoulli's law a moving fluid causes a pressure differential across the restriction in the flow channel. This pressure differential is proportional to a square of the volumetric flow rate.

In order to achieve good measurement accuracy, it is necessary that the same flow profile occurs at the measurement point at practically all times. This requires sufficiently long straight pipe runs before and behind the measurement point in order to stabilize the flow profile.

Narrowing the flow channel by the restricting element results in a considerable nonrecoverable pressure loss in the fluid.

Modern differential pressure flowmeters comprise means for calculating the square root of the differential pressure which is proportional to the flow rate. They produce an output proportional to the flow rate.

Older devices provide an output proportional to the square of the flow rate. These older devices are still common in industry. Usually they are part of a large industrial process and supply their output signals to process control unit, for example to distributed control systems (DCS) or digital logical controllers (DLC). These process control units are programmed to be able to read and interpret the output signals of theses differential pressure flowmeters.

Despite the disadvantages involved with differential pressure flowmeters there is a reluctancy to replace these flowmeters by more suitable ones. Replacement of differential pressure flowmeters producing output signals proportional to the square of the flow rate requires extensive and costly reprogramming of the process control units involved.

SUMMARY OF THE INVENTION

It is an object of the invention to provide a flowmeter, suitable for replacement of differential pressure flowmeters.

To this end the invention provides a flowmeter comprising:
  a primary flow sensor;
  sensor electronics for proving a measurement signal;
  a signal processing unit for determining the flow;
  the signal processing unit can be set to produce a signal proportional to the flowrate or the square of the flowrate; and
  an output signal generator for generating an output signal proportional to the signal of the signal processing unit.

According to a preferred embodiment, the flowmeter comprises a communication interface, allowing a user to set the output signal to be proportional to the flowrate or the square of the flowrate.

The invention and further advantages are explained in more detail using the figure of the drawing, in which one exemplary embodiment is shown.

BRIEF DESCRIPTION OF THE DRAWING

The sole FIGURE, illustrates a schematic diagram of a flowmeter according to the invention.

DETAILED DESCRIPTION OF THE PREFERRED EMBODIMENT

The sole FIGURE shows a schematic diagram of a flowmeter according to the invention. It comprises a primary flow sensor 1. In the embodiment shown the flowmeter is an ultrasonic flowmeter. Other flowmeters, for example vortex flowmeters, coriolis flowmeters or electromagnetic flowmeters can also be used. The primary flow sensor 1 comprises two ultrasonic transducers 3. They are mounted on a rack 5 on a pipe 7. One ultrasonic transducer 3 is located upstream of the other. A flowrate of a fluid inside the pipe 7 is to be measured.

Both ultrasonic transducers 3 act as transmitters and receivers for ultrasonic beams 9. In operation each ultrasonic transducer 3 transmits an ultrasonic beam 9 into the pipe 7.

The beam 9 is reflected by the opposing pipewall and received by the other ultrasonic transmitter 3.

The ultrasonic flowmeter comprises sensor electronics 10 for transforming signals of the ultrasonic transducers 3 into a measurement signal. The measurement signal is supplied to a signal processing unit 11 for determining the flow.

To this extent it determines the difference in transit time between beams 9 transmitted in a single path along and against the flow. The flow velocity is directly proportional to the difference of the upstream and downstream transit times. A product of a cross-sectional area of the pipe and the flow velocity provides a measure of the volumetric flow.

In the embodiment shown, the signal processing unit 11 comprises a microprocessor 13 and a memory 15 for storing a flow calculation program. The flow is calculated by running the flow calculation program on the microprocessor 13.

The signal processing unit 11 can be set to produce a signal proportional to the flowrate or to the square of the flowrate. The setting is preferably stored in a memory 17 accessible to the microprocessor 13. When the signal processing unit 11 is set to produce a signal proportional to the square of the flowrate the square of the flowrate is calculated by the microprocessor 13.

The signal processing unit 11 provides its signal to an output signal generator 18 for generating an output signal proportional to the signal of the signal processing unit 11.

Various forms of output signals are feasible. Preferably an industry standard, for example a signal current between 4 mA and 20 mA, a signal according to the HART standard, or a standardized bus signal, for example according to field bus foundation standards or profibus, is generated.

Preferably the flowmeter comprises a communication interface 19, allowing a user to set the output signal to be proportional to the flowrate or the square of the flowrate. The setting is then stored in the memory 17.

With a flowmeter according to the invention it is possible to generate an output signal proportional to the square of the flow rate. This allows replacement in particular of older differential pressure flowmeters, showing this form of output signal, without extensive reprogramming of process control units.

What is claimed is:

1. A flowmeter for replacing a differential flowmeter in a fluid flow system, comprising:
    a primary flow sensor;
    sensor electronics connected to said primary flow sensor for proving a measurement signal;
    a signal processing unit connected to said sensor electronics for determining the flow, said signal processing unit being set to produce a signal proportional to the square of the flowrate; and
    an output signal generator for generating an output signal proportional to the signal of the signal processing unit.

2. An ultrasonic flowmeter for measuring fluid flow and for replacing a differential flowmeter in a fluid flow system, comprising:
    a primary flow sensor including a pair of ultrasonic transducers which are spaced apart in the direction of the fluid flow, each ultrasonic transducer emitting an ultrasonic beam into the fluid flow which is received by the other ultrasonic transducer;
    sensor electronics connected to and receiving the signals generated by said ultrasonic transducers, and generating therefrom a measurement signal; and
    a signal processing unit for receiving said measurement signal and determining the flow of the fluid by producing a signal proportional to the square of the flowrate of the fluid.

* * * * *